United States Patent
Gorohkov et al.

(10) Patent No.: US 9,295,008 B2
(45) Date of Patent: *Mar. 22, 2016

(54) METHOD AND APPARATUS FOR UTILIZING OTHER SECTOR INTERFERENCE (OSI) INDICATION

(71) Applicant: QUALCOMM Incorporated, San Diego, CA (US)

(72) Inventors: Alexei Yurievitch Gorohkov, San Diego, CA (US); Aamod Dinkar Khandekar, San Diego, CA (US); Jaber Mohammad Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/853,283

(22) Filed: Mar. 29, 2013

(65) Prior Publication Data

US 2013/0215760 A1    Aug. 22, 2013

Related U.S. Application Data

(62) Division of application No. 11/968,638, filed on Jan. 2, 2008, now Pat. No. 8,433,357.

(60) Provisional application No. 60/883,387, filed on Jan. 4, 2007, provisional application No. 60/883,758, filed on Jan. 5, 2007.

(51) Int. Cl.
*H04W 52/24* (2009.01)
*H04W 52/14* (2009.01)
(Continued)

(52) U.S. Cl.
CPC .......... *H04W 52/243* (2013.01); *H04W 52/146* (2013.01); *H04W 52/16* (2013.01); *H04W 52/247* (2013.01); *H04W 52/362* (2013.01); *H04W 52/60* (2013.01); *H04W 72/08* (2013.01)

(58) Field of Classification Search
CPC . H04W 52/00; H04W 52/243; H04W 52/146; H04W 52/16; H04W 52/247; H04W 52/362; H04W 52/60; H04W 72/08
See application file for complete search history.

(56) References Cited

U.S. PATENT DOCUMENTS

| 4,926,416 | A | 5/1990 | Weik |
| 5,864,577 | A | 1/1999 | Ramel |

(Continued)

FOREIGN PATENT DOCUMENTS

| CA | 2605556 A1 | 12/2006 |
| CN | 1525678 A | 9/2004 |

(Continued)

OTHER PUBLICATIONS

Tomcik J., "MBFDD and MBTDD Wideband Mode: Technology Overview", IEEE 802.20 Working Group on Mobile Broadband Wireless Access, pp. 1-109, Jan. 6, 2006, IEEE C802.20-05/68r1.

(Continued)

*Primary Examiner* — Andrew Lai
*Assistant Examiner* — Sumitra Ganguly
(74) *Attorney, Agent, or Firm* — François A. Pelaez

(57) ABSTRACT

Techniques for mitigating interference in a wireless communication system are described. In one design, a sector may determine multiple fast other sector interference (OSI) indications for multiple subzones, with each subzone corresponding to a different portion of the system bandwidth. At least one report may be generated for the multiple OSI indications, with each report including at least one OSI indication for at least one subzone. Each report may be encoded to obtain code bits, which may then be mapped to a sequence of modulation symbols. A sequence of modulation symbols of zero values may be generated for each report with all OSI indications in the report set to zero to indicate lack of high interference in the corresponding subzones. This allows a report to be transmitted with zero power in a likely scenario. A regular OSI indication may also be determined for the system bandwidth and transmitted.

21 Claims, 6 Drawing Sheets

(51) Int. Cl.
H04W 52/16 (2009.01)
H04W 52/36 (2009.01)
H04W 52/60 (2009.01)
H04W 72/08 (2009.01)

(56) References Cited

U.S. PATENT DOCUMENTS

| | | | |
|---|---|---|---|
| 5,896,357 | A | 4/1999 | Shinozaki et al. |
| 6,278,685 | B1 | 8/2001 | Yonge, III |
| 6,363,060 | B1 | 3/2002 | Sarkar |
| 6,400,699 | B1 | 6/2002 | Airy et al. |
| 6,542,743 | B1 | 4/2003 | Soliman |
| 6,768,713 | B1 | 7/2004 | Siala et al. |
| 6,845,104 | B2 | 1/2005 | Johnson et al. |
| 6,928,066 | B1 | 8/2005 | Moon et al. |
| 7,242,722 | B2 | 7/2007 | Krauss et al. |
| 7,280,467 | B2 | 10/2007 | Smee et al. |
| 7,554,948 | B2 | 6/2009 | Naguib et al. |
| 7,742,444 | B2 | 6/2010 | Mese et al. |
| 7,768,979 | B2 | 8/2010 | Sutivong et al. |
| 7,852,799 | B2 | 12/2010 | Nanda et al. |
| 8,089,940 | B2 | 1/2012 | Rezaiifar et al. |
| 8,320,407 | B2 | 11/2012 | Palanki et al. |
| 8,433,357 | B2 * | 4/2013 | Gorokhov ........... H04W 52/243 455/522 |
| 8,457,315 | B2 | 6/2013 | Khandekar et al. |
| 8,681,749 | B2 | 3/2014 | Khandekar et al. |
| 8,693,444 | B2 | 4/2014 | Khandekar et al. |
| 2004/0062321 | A1 | 4/2004 | Nakamura et al. |
| 2005/0025039 | A1 | 2/2005 | Hwang et al. |
| 2005/0120097 | A1 | 6/2005 | Walton et al. |
| 2005/0122928 | A1 | 6/2005 | Vijayan et al. |
| 2005/0135324 | A1 | 6/2005 | Kim et al. |
| 2005/0163194 | A1 | 7/2005 | Gore et al. |
| 2005/0165949 | A1 | 7/2005 | Teague |
| 2005/0286405 | A1 | 12/2005 | Sun et al. |
| 2006/0019694 | A1 * | 1/2006 | Sutivong ............... H04W 52/24 455/522 |
| 2006/0062247 | A1 | 3/2006 | Li |
| 2006/0109810 | A1 | 5/2006 | Au et al. |
| 2006/0133388 | A1 | 6/2006 | Wang et al. |
| 2006/0209721 | A1 | 9/2006 | Mese et al. |
| 2006/0209973 | A1 | 9/2006 | Gorokhov et al. |
| 2006/0215559 | A1 | 9/2006 | Mese et al. |
| 2006/0215684 | A1 | 9/2006 | Capone et al. |
| 2006/0223449 | A1 | 10/2006 | Sampath et al. |
| 2006/0285503 | A1 * | 12/2006 | Mese ................. H04L 1/0017 370/254 |
| 2007/0009054 | A1 | 1/2007 | Kwak et al. |
| 2008/0019314 | A1 | 1/2008 | Gorokhov et al. |
| 2008/0101441 | A1 | 5/2008 | Palanki et al. |
| 2008/0167040 | A1 | 7/2008 | Khandekar et al. |
| 2009/0161772 | A1 | 6/2009 | Sawahashi et al. |
| 2009/0323642 | A1 | 12/2009 | Tanno et al. |
| 2012/0218943 | A1 | 8/2012 | Khandekar et al. |
| 2013/0243039 | A1 | 9/2013 | Khandekar et al. |

FOREIGN PATENT DOCUMENTS

| | | |
|---|---|---|
| CN | 1701530 A | 11/2005 |
| EP | 0320772 A2 | 6/1989 |
| EP | 0650304 A2 | 4/1995 |
| EP | 0917305 A2 | 5/1999 |
| EP | 1289328 | 3/2003 |
| JP | 07183862 | 7/1995 |
| JP | 10502507 | 3/1998 |
| JP | H11266224 A | 9/1999 |
| JP | 2002101062 | 4/2002 |
| JP | 2005333677 A | 12/2005 |
| JP | 2006203355 A | 8/2006 |
| JP | 2006287757 A | 10/2006 |
| JP | 2006311465 A | 11/2006 |
| JP | 2007520169 A | 7/2007 |
| JP | 2008546316 A | 12/2008 |
| JP | 2008547252 A | 12/2008 |
| KR | 20000026410 A | 5/2000 |
| RU | 99126427 | 10/2001 |
| RU | 2187205 C2 | 8/2002 |
| RU | 2191477 | 10/2002 |
| RU | 2201035 C2 | 3/2003 |
| RU | 2242091 C2 | 12/2004 |
| RU | 2250564 | 4/2005 |
| RU | 2282943 C2 | 8/2006 |
| WO | WO-9715994 A1 | 5/1997 |
| WO | 9852326 A2 | 11/1998 |
| WO | 0013427 A2 | 3/2000 |
| WO | 0126269 A1 | 4/2001 |
| WO | 02058300 A1 | 7/2002 |
| WO | 03001741 A1 | 1/2003 |
| WO | 2004064295 A2 | 7/2004 |
| WO | 2005006618 A1 | 1/2005 |
| WO | 2005046259 A2 | 5/2005 |
| WO | 2005074184 A2 | 8/2005 |
| WO | 2006002658 A1 | 1/2006 |
| WO | WO-2006020611 A2 | 2/2006 |
| WO | 2006046894 A1 | 5/2006 |
| WO | 2006130742 A1 | 12/2006 |
| WO | 2006133598 A1 | 12/2006 |
| WO | 2006134829 A1 | 12/2006 |
| WO | 2006137708 | 12/2006 |
| WO | WO-2006132835 A2 | 12/2006 |

OTHER PUBLICATIONS

3GPP2 C.S0084-002, Version 2, "Medium Access Control Layer for Ultra Mobile Broadband (UMB) Air Interface Specification," Aug. 2007.

802.16e-2005 and IEEE Std 802.16/2004/Cor1-2005; Section 8.4.6.1.1 Preamble, Published 2006 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1.

Borran J., et al., "RL Traffic Power Control for LBC FDD", C30-20061030-076, 3GPP2, Oct. 2006, p. 1-15.

IEEE 802.11, IEEE Wireless LAN Edition, A Compilation Based on IEEE Std. 802.11-1999 (R2003) and its Amendments.

IEEE 802.16 IEEE Standard for Local and metropolitan area networks, Part 16: Air Interface for Fixed Broadband Wireless Access Systems, IEEE Std. 802.16-2004 (Revision of IEEE Std. 802.16-2001), Oct. 1, 2004.

IEEE Std. 802.20, 802.20/D0.2m, Jun. 2007, Draft Standard for Local and Metropolitan Area Networks—Standard Air Interface for Mobile Broadband Wireless Access Systems Supporting Vehicular Mobility—Physical and Media Access Control Layer Specification.

International Search Report—PCT/US08/050179, International Search Authority—European Patent Office, Jun. 19, 2008.

Taiwan Search Report—TW097100516—TIPO—Jun. 3, 2011.

TIA-1121.001 "Physical Layer for Ultra Mobile Broadband (UMB) Air Interface Specification," 3GPP2 C.S0084-001-0, Version 2.0 (Aug. 2007).

Written Opinion—PCT/US08/050179, International Search Authority—European Patent Office, Jun. 19, 2008.

Panasonic: "Mapping of PDCCH, ACK/NACK and Cat0 [online]," 3GPP TSG-RAN WG1 Meeting #49, R1-072088, May 2, 2007.

* cited by examiner

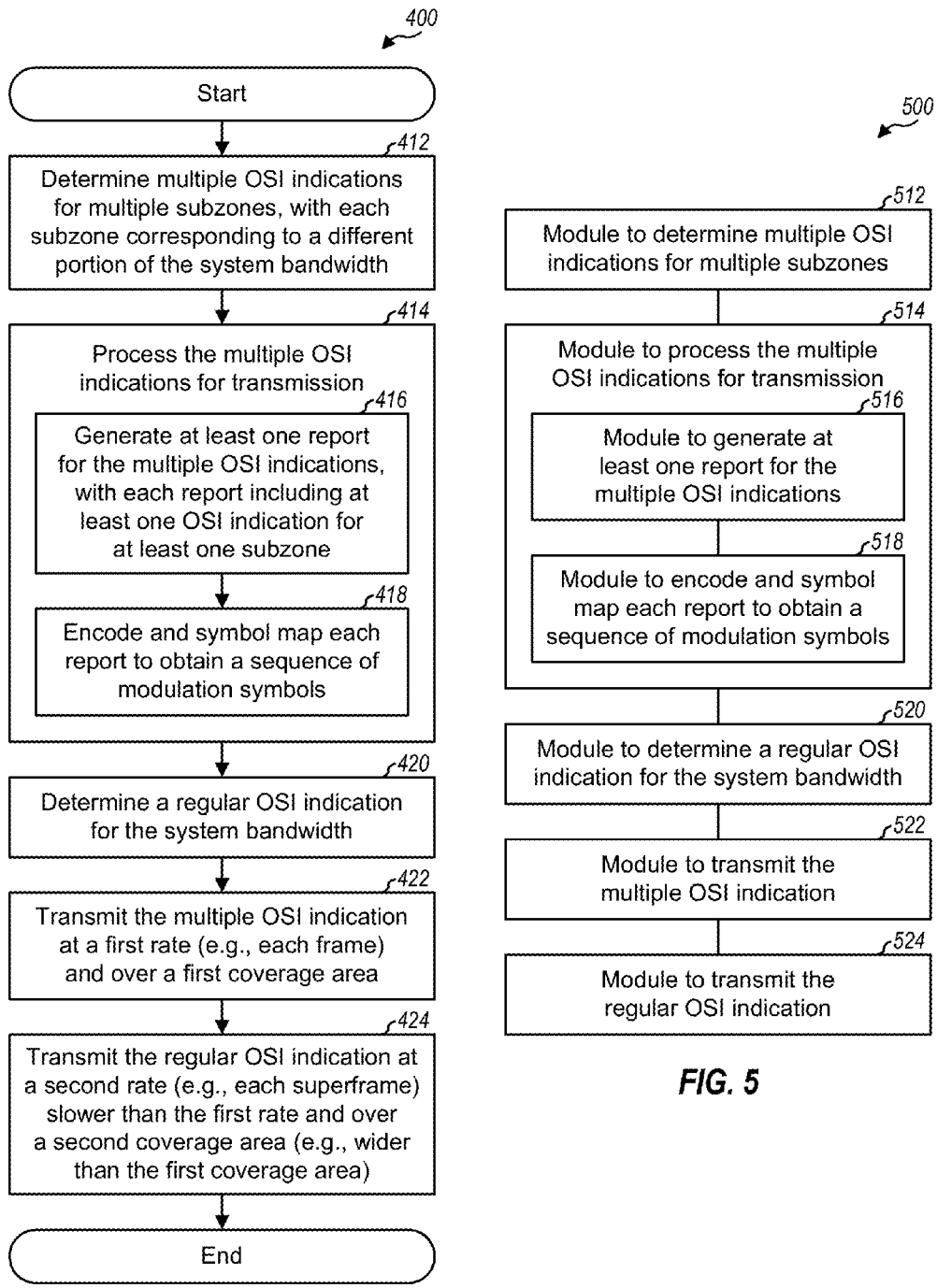

METHOD AND APPARATUS FOR UTILIZING OTHER SECTOR INTERFERENCE (OSI) INDICATION

The present application is a Divisional of U.S. application Ser. No. 11/968,638, entitled "METHOD AND APPARATUS FOR UTILIZING OTHER OTHER SECTOR INTERFERENCE (OSI) INDICATION," filed Jan. 2, 2008, which claims priority to provisional U.S. Application Ser. No. 60/883,387, entitled "A METHOD AND APPARATUS FOR FAST OTHER SECTOR INTERFERENCE (OSI) ADJUSTMENT," filed Jan. 4, 2007, and provisional U.S. Application Ser. No. 60/883,758, entitled "WIRELESS COMMUNICATION SYSTEM," filed Jan. 5, 2007, both assigned to the assignee hereof and incorporated herein by reference.

BACKGROUND

I. Field

The present disclosure relates generally to communication, and more specifically to techniques for mitigating interference in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A wireless multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This may be achieved by multiplexing the transmissions on each link to be orthogonal to one another in time, frequency and/or code domain.

On the reverse link, the transmissions from terminals communicating with different base stations are typically not orthogonal to one another. Consequently, each terminal may cause interference to other terminals communicating with nearby base stations and may also receive interference from these other terminals. The performance of each terminal may be degraded by the interference from other terminals communicating with other base stations.

There is therefore a need in the art for techniques to mitigate interference in a wireless communication system.

SUMMARY

Techniques for mitigating interference in a wireless communication system are described herein. In an aspect, a sector may estimate inter-sector interference observed by the sector from terminals communicating with neighbor sectors. The sector may generate and transmit other sector interference (OSI) indications that convey the amount of interference observed by the sector. In one design, the OSI indications may include a regular OSI indication and fast OSI indications. The regular OSI indication may be generated based on long-term average interference, which may be obtained by averaging interference over a larger frequency range and across a longer time interval. The fast OSI indications may be generated based on short-term average interference, which may be obtained by averaging interference over a smaller frequency range and across a shorter time interval. A terminal may adjust its transmit power based on the regular and fast OSI indications received from neighbor sectors.

In one design, a sector may determine multiple fast OSI indications for multiple subzones, with each subzone corresponding to a different portion of the system bandwidth. At least one report may be generated for the fast OSI indications, with each report including at least one fast OSI indication for at least one subzone. Each report may be encoded to obtain code bits, which may then be mapped to a sequence of modulation symbols. A sequence of modulation symbols of zero values may be generated for each report with all fast OSI indications in the report set to zero to indicate lack of high interference in the corresponding subzones. This allows a report to be transmitted with zero power in a likely scenario. A regular OSI indication may also be determined and transmitted.

In one design, a terminal may receive at least one fast OSI indication for at least one subzone and may determine its transmit power based on the at least one fast OSI indication. At least one delta may be maintained for the at least one subzone and may be adjusted based on the at least one fast OSI indication. Transmit power for a reference (e.g., pilot) channel may be determined based on closed-loop power control. The transmit power for each subzone may then be determined based on the delta for the subzone and the transmit power for the reference channel.

Various aspects and features of the disclosure are described in further detail below.

BRIEF DESCRIPTION OF THE DRAWINGS

FIG. 4 shows a process for transmitting OSI indications.
FIG. 5 shows an apparatus for transmitting OSI indications.

DETAILED DESCRIPTION

Figure 1:
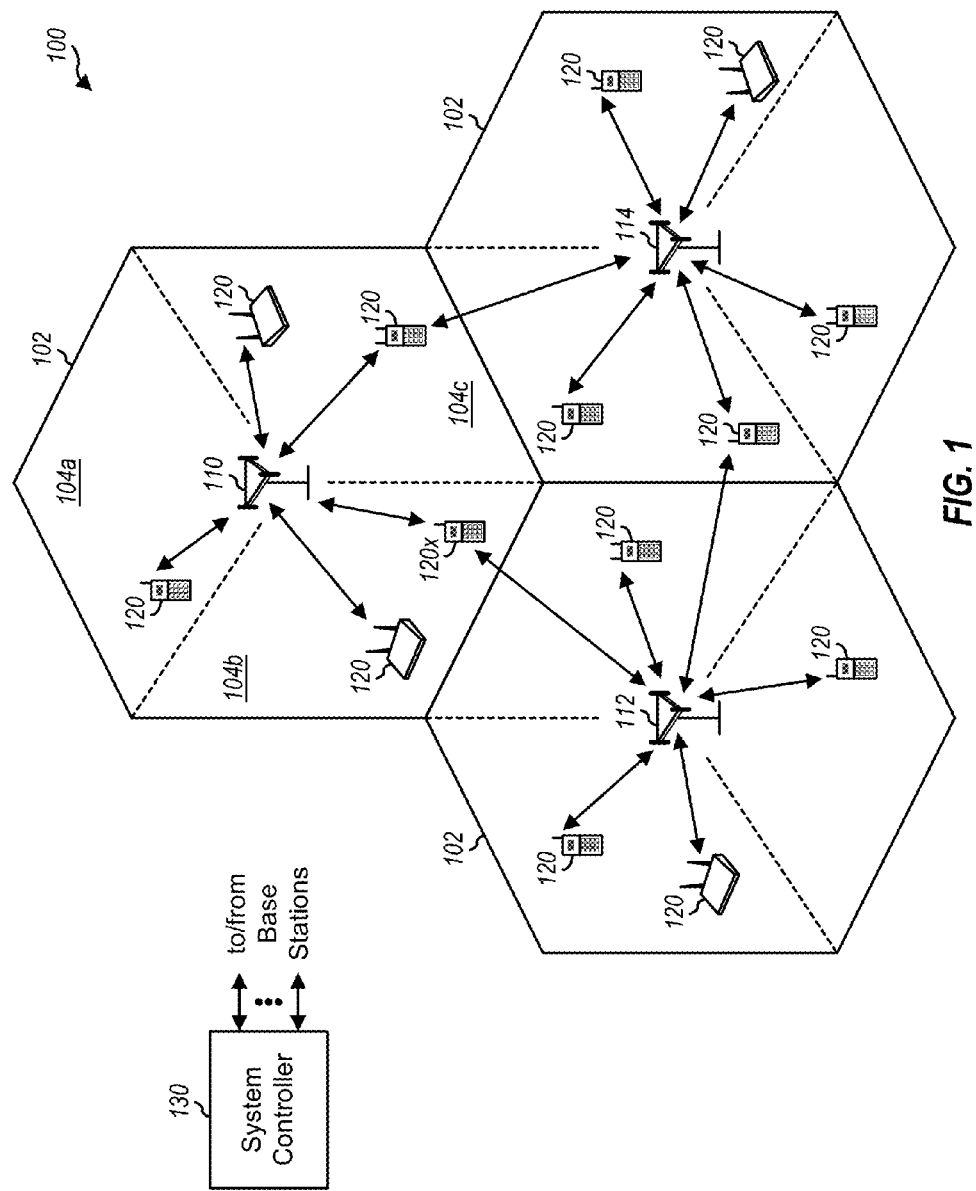
FIG. 1 shows a wireless communication system.

FIG. 1 shows a wireless communication system 100, which may also be referred to as an access network (AN). The terms "system" and "network" are often used interchangeably. System 100 includes multiple base stations 110, 112 and 114 and multiple terminals 120. A base station is a station that communicates with the terminals. A base station may also be referred to as an access point, a Node B, an evolved Node B, etc. Each base station provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104*a*, 104*b* and 104*c*. Each smaller area may be served by a respective base station subsystem. The term "sector" can refer to the smallest coverage area of a base station and/or a base station subsystem serving this coverage area.

Terminals 120 may be dispersed throughout the system, and each terminal may be stationary or mobile. A terminal may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with zero, one, or multiple base stations on the forward and/or reverse link at any given moment.

For a centralized architecture, a system controller 130 may couple to base stations 110 and provide coordination and control for these base stations. System controller 130 may be a single network entity or a collection of network entities. For a distributed architecture, the base stations may communicate with one another as needed.

The techniques described herein may be used for a system with sectorized cells as well as a system with un-sectorized cells. For clarity, the techniques are described below for a system with sectorized cells. In the following description, the terms "sector" and "base station" are used interchangeably, and the terms "terminal" and "user" are also used interchangeably. A serving sector is a sector with which a terminal communicates. A neighbor sector is a sector with which the terminal is not in communication.

The techniques described herein may also be used for various wireless communication systems such as CDMA, TDMA, FDMA, OFDMA, and SC-FDMA systems. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11, IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," and 3GPP2 C.S0084-002, entitled "Medium Access Control Layer For Ultra Mobile Broadband (UMB) Air Interface Specification," both dated August 2007 and publicly available.

System 100 may utilize orthogonal frequency division multiplexing (OFDM) and/or single-carrier frequency division multiplexing (SC-FDM). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the number of subcarriers may be dependent on the system bandwidth. For example, there may be 128, 256, 512, 1024 or 2048 subcarriers for system bandwidth of 1.25, 2.5, 5, 10 or 20 MHz, respectively.

Figure 2:
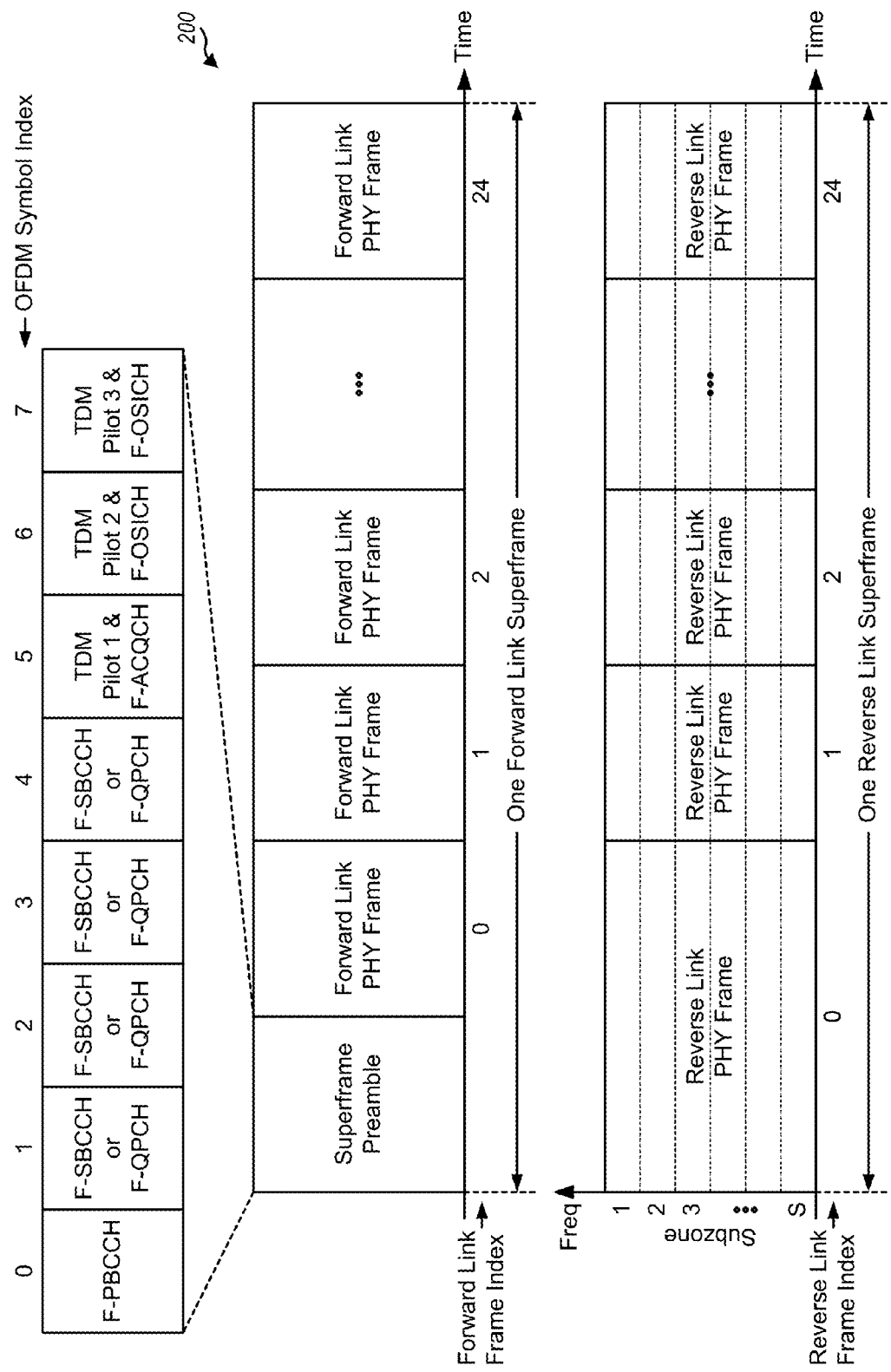
FIG. 2 shows a superframe structure.

FIG. 2 shows a design of a superframe structure 200 that may be used for system 100. The transmission timeline for each link may be partitioned into units of superframes. Each superframe may span a particular time duration, which may be fixed or configurable. On the forward link, each superframe may include a preamble followed by M physical layer (PHY) frames, where M may be any integer value. On the reverse link, each superframe may include M PHY frames, where the first PHY frame may be extended by the length of the superframe preamble on the forward link. In the design shown in FIG. 2, each superframe includes 25 PHY frames with indices of 0 through 24. Each PHY frame may carry traffic data, signaling, pilot, etc.

In one design, the superframe preamble includes eight OFDM symbols with indices of 0 through 7. OFDM symbol 0 comprises a Forward Primary Broadcast Control Channel (F-PBCCH) that carries information for deployment-specific parameters. OFDM symbols 1 through 4 comprises a Forward Secondary Broadcast Control Channel (F-SBCCH) that carries information for sector-specific parameters as well as a Forward Quick Paging Channel (F-QPCH) that carries paging information. OFDM symbols 5, 6 and 7 comprise time division multiplexed (TDM) pilots 1, 2 and 3, respectively, which may be used by terminals for initial acquisition. TDM pilot 1 is used as a Forward Acquisition Channel (F-ACQCH). A Forward Other-Sector-Interference Channel (F-OSICH) is sent in TDM pilots 2 and 3. The superframe preamble may also be defined in other manners.

The system may support hybrid automatic retransmission (HARQ). With HARQ, one or more transmissions may be sent for a packet until the packet is decoded correctly or is terminated by some other condition. Multiple (Q) HARQ interlaces may be defined, with HARQ interlace i including PHY frames i, Q+i, 2Q+i, etc., for $i \in \{0, \ldots, Q-1\}$. Each packet may be sent on one HARQ interlace, and one or more HARQ transmissions may be sent for the packet on that HARQ interlace. An HARQ transmission is a transmission for one packet in one PHY frame.

Multiple (S) subzones may be defined, with each subzone corresponding to a different portion of the system bandwidth. A subzone may also be referred to as a subband, a frequency segment, etc. In general, a subzone may correspond to physical frequency resources (e.g., subcarriers) or logical frequency resources (e.g., hop ports) that may be mapped to physical frequency resources. In one design, K hop ports may be defined and may be mapped to the K total subcarriers based on a known mapping. The hop ports may simplify the allocation of resources. The K hop ports may be arranged into S subzones, with each subzone including L hop ports, where L and S may be fixed or configurable values. For example, L may be equal to 64 or 128, and S may be dependent on the system bandwidth.

FIG. 2 shows a specific frame structure design. Other frame structures may also be used to send traffic data, signaling, pilot, etc. The system bandwidth may also be partitioned in other manners.

Each sector may receive transmissions from terminals within the sector as well as transmissions from terminals in other sectors. The total interference observed by each sector is composed of (i) intra-sector interference from terminals within the same sector and (ii) inter-sector interference from terminals in other sectors. The inter-sector interference is also referred to as other sector interference (OSI) and may be mitigated as described below.

In an aspect, each sector may determine and transmit OSI indications that convey the amount of interference observed by that sector. An OSI indication may also be referred to as an OSI value, an OSI indicator, an interference indicator, etc. In one design, each sector may generate and transmit the OSI indications shown in Table 1.

TABLE 1

| OSI | Description |
|---|---|
| Regular OSI Indication | Convey inter-sector interference averaged over a larger frequency range (e.g., the entire system bandwidth) and across a longer time interval (e.g., one superframe). |
| Fast OSI Indication | Convey inter-sector interference averaged over a smaller frequency range (e.g., one subzone) and across a shorter time interval (e.g., one PHY frame). |

For clarity, the generation of OSI indications by one sector 112 is described below. Sector 112 may estimate the interference observed by that sector on different time frequency resources. The interference may be quantified by an interference-over-thermal (IoT) or some other quantity. IoT is a ratio of the total interference power observed by a sector to the thermal noise power. Sector 112 may average the interference over the entire system bandwidth and across a superframe to obtain a long-term average of the interference. In one design, sector 112 may compare the long-term average interference against a set of thresholds to determine a regular OSI indication, as follows:

$$\text{Regular\_OSI}(n) = \begin{cases} \text{'2'} & \text{if } Th2 \le \text{Interference}_{long-term}(n), \\ \text{'1'} & \text{if } Th1 \le \text{Interference}_{long-term}(n) < Th2, \\ \text{'0'} & \text{if } \text{Interference}_{long-term}(n) < Th1, \end{cases} \quad \text{Eq (1)}$$

where Interference$_{long-term}$(n) is the long-term average interference for superframe n, Th1 and Th2 are thresholds for generating the regular OSI indication, and Regular_OSI(n) is the regular OSI indication for superframe n.

The Th1 threshold may be set to a target operating point for sector 112 or the system. The Th2 threshold may be set to a higher value used to detect excessive interference at sector 112. In this case, the regular OSI value may be set to '0' to indicate low inter-sector interference, to '1' to indicate moderate inter-sector interference, and '2' to indicate excessive inter-sector interference. The regular OSI indication may also be generated in other manners and may comprise any number of bits of information.

Sector 112 may also average the interference over each subzone and across a PHY frame to obtain a short-term average of the interference. In one design, sector 112 may compare the short-term average interference against a threshold to determine a fast OSI indication, as follows:

$$\text{Fast\_OSI}(n, m, s) = \begin{cases} \text{'1'} & \text{if } \text{Interference}_{short-term}(n, m, s) \ge Th3, \\ \text{'0'} & \text{if } \text{Interference}_{short-term}(n, m, s) < Th3, \end{cases} \quad \text{Eq (2)}$$

where Interference$_{short-term}$(n,m,s) is the short-term average interference for subzone s in PHY frame m of superframe n, Th3 is a threshold for generating the fast OSI indication, and Fast_OSI(n,m,s) is the fast OSI indication for subzone s in PHY frame m of superframe n.

In the design shown in equation (2), the fast OSI indication is set to '1' if the short-term average interference is equal to or greater than the Th3 threshold and to '0' otherwise. The fast OSI indication may also be generated in other manners and may comprise any number of bits of information. The thresholds may be selected such that Th3>Th2>Th1. In this case, the fast OSI indication may be used to control the tail of the interference distribution when high interference is observed at sector 112. Sector 112 may observe different amounts of interference on different subzones and/or in different PHY frames and may generate different fast OSI indications for different subzones in different PHY frames.

In general, the regular and fast OSI indications may be determined based on any interference metric and any function. A function of the measured interference over different time frequency resources may be used to generate the OSI indications, as described above. In another design, a function of the average and maximum interference measured over different time frequency resources may be used to generate the OSI indications. This function may be especially applicable for the fast OSI indications.

The regular OSI indication may convey the overall interference observed by sector 112 over all or a large portion of the system bandwidth and across an extended period of time (e.g., a superframe). The regular OSI indication may be used for power control by all or many terminals in neighbor sectors. The fast OSI indications may convey the interference observed by sector 112 in specific portions (e.g., subzones) of the system bandwidth and in specific time intervals (e.g., PHY frames). The fast OSI indications may be used for power control by specific terminals in neighbor sectors operating in subzones and PHY frames with high interference.

Sector 112 may also estimate interference from terminals in specific neighbor sectors and may generate fast OSI indications for specific neighbor sectors. The terminals in each neighbor sector causing high interference, as indicated by the fast OSI indication for that neighbor sector, may reduce their transmit power to mitigate interference to sector 112.

In general, fast OSI indications may be generated for different subzones, different PHY frames, different neighbor sectors, etc., or any combination thereof. Different regular and/or fast OSI indications may be grouped together for a subzone, a subzone and sector combination, etc. For clarity, the following description is for the design in which fast OSI indications are generated for each subzone in each PHY frame.

Sector 112 may transmit the regular OSI indication on the F-OSICH in various manners. It may be desirable to transmit the F-OSICH over a large coverage area so that the F-OSICH can be decoded by terminals not served by sector 112. It may also be desirable for the F-OSICH to have the same coverage as the TDM/acquisition pilots, which may penetrate far into neighbor sectors. It may further be desirable for the F-OSICH to be decodable without requiring additional information regarding the transmitting sector (e.g., other than pilot pseudo-random (PN) information). These requirements may make the transmission of the F-OSICH expensive in terms of the required transmit power and/or time frequency resources and may limit the rate at which the F-OSICH can be sent.

In one design, the F-OSICH is sent in TDM pilots 2 and 3 in the superframe preamble, as shown in FIG. 2. The regular OSI indication may modulate the phase of TDM pilots 2 and 3. In one design, the regular OSI indication may take on a value of 0, 1 or 2 and may modulate the phase of the TDM pilots by 0, 2π/3 or 4π/3, respectively. The TDM pilots may be sent with sufficient transmit power in order to penetrate deep into the neighbor sectors. By embedding the F-OSICH in the TDM pilots, the regular OSI indication would have the same coverage as the TDM pilots and may be received by terminals located throughout the neighbor sectors.

Sector 112 may also transmit the fast OSI indications in various manners. In one design, the fast OSI indications are sent on a Forward Fast OSI Channel (F-FOSICH) in each PHY frame on the forward link.

In one design, the fast OSI indications may be sent in one or more fast OSI reports, with each report being encoded and modulated separately. In general, each report may include any number of bits for any number of fast OSI indications. In one design, each report includes four bits for four fast OSI indications, which may be for four subzones in one PHY frame. The four bits may be encoded based on a coding scheme to obtain 12 code bits. The coding scheme may include a forward error detection code such as a cyclic redundancy check (CRC) and/or a forward error correction code such as a convolutional code. In one design, a 2-bit CRC is generated for a 4-bit report, and the resultant 6 bits are encoded with a rate 1/2 convolutional code to generate 12 code bits for the report. The CRC and convolutional code form a rate 1/3 concatenated code. The 12 code bits may be mapped to 6 modulation symbols based on QPSK. The 6 modulation symbols may be sent for the report.

In general, the number of fast OSI reports to send may be dependent on various factors such as the system bandwidth, the number of subzones, the number of PHY frames, etc. For example, if the system bandwidth is 5 MHz and four subzones of 1.25 MHz are defined, then four fast OSI indications may be generated for the four subzones in a PHY frame. A single report containing the four fast OSI indications may be sent with 6 modulation symbols. If the system bandwidth is 20 MHz and 16 subzones of 1.25 MHz are defined, then 16 fast OSI indications may be generated for the 16 subzones in a PHY frame. Four reports may be sent with a total of 24 modulation symbols, with each report containing four fast OSI indications for four different subzones.

It is desirable to transmit the reports for the fast OSI indications with as little transmit power as possible. A fast OSI indication may be set to '1' if the short-term average interference exceeds the Th3 threshold, which may be higher than the highest threshold Th2 used for the regular OSI indication. Thus, the likelihood of a fast OSI indication being set to '1' may be low whereas the likelihood of the fast OSI indication being set to '0' may be high. In one design, a report containing fast OSI indications of all zeros is transmitted with zero power by mapping this report to a sequence of modulation symbols of zero values. For example, a 4-bit report containing '0000' may be encoded and mapped to six modulation symbols of {0, 0, 0, 0, 0, 0}, with each modulation symbol of 0 being transmitted with zero power. In effect, the 4-bit report of '0000' is not transmitted, and no power is consumed to convey the four fast OSI indications of all zeros. This design may reduce the amount of transmit power used to send fast OSI indications.

In another design, the fast OSI indications may be sent individually. For example, each fast OSI indication may be mapped to one or more modulation symbols. To reduce transmit power, a fast OSI indication of '0' may be mapped to a modulation symbol of zero, and a fast OSI indication of '1' may be mapped to a non-zero modulation symbol. The number of modulation symbols to use for each fast OSI indication and/or the transmit power for the modulation symbols may be dependent on the desired reliability and coverage for the fast OSI indications.

In general, the fast OSI indications may be transmitted in groups and/or individually. Transmitting the fast OSI indications in groups may allow for more efficient encoding of a report for a group of fast OSI indications, which may allow the report to be transmitted with less time frequency resources and/or lower transmit power for the desired reliability and coverage. However, transmitting in groups may result in lower probability of all fast OSI indications in the report being zeros and hence not transmitted. Conversely, transmitting the fast OSI indications individually may result in higher probability of non-transmission of fast OSI indications with values of '0', which may reduce transmit power. However, more transmit power and/or more time frequency resources may be used for the fast OSI indications that are actually transmitted. The manner in which the fast OSI indications are transmitted may be selected based on a tradeoff between various factors such as transmit power, resource usage, coverage, reliability, etc.

On the reverse link, each terminal may be allowed to transmit at a power level that is as high as possible while keeping interference to within acceptable levels. A terminal located closer to its serving sector may be allowed to transmit at a higher power level since this terminal will likely cause less interference to neighbor sectors. Conversely, a terminal located farther away from its serving sector and near the coverage edge may be allowed to transmit at a lower power level since this terminal may cause more interference to neighbor sectors. Controlling transmit power in this manner may reduce the interference observed by each sector while allowing terminals with good channel conditions to achieve higher data rates.

A given terminal 120x may adjust its transmit power based on a power control mechanism in order to achieve both reliable transmission to its serving sector as well as an acceptable level of interference at neighbor sectors. In general, transmit power may be given by (i) a power spectral density (PSD) in units of decibels/Hertz (dB/Hz), (ii) transmit power per modulation symbol, or (iii) some other metric.

In the description below, transmit power is given per modulation symbol. In one design, terminal 120x may adjust the transmit power of a reference channel to achieve a desired level of performance for the reference channel. Terminal 120 may then determine the transmit power of a data/traffic channel based on the transmit power of the reference channel. The reference channel may be a Reverse Pilot Channel (R-PICH), an acknowledgement channel, a dedicated control channel, an access channel, a request channel, etc. In one design that is described below, the reference channel is the R-PICH, and the data/traffic channel is a Reverse OFDMA Data Channel (R-ODCH).

In one design, closed-loop power control may be performed for the R-PICH. For the closed-loop power control, the serving sector may receive the R-PICH from terminal 120x, determine the received signal quality of the R-PICH, and send a power control (PC) bit of '1' if the received signal quality is below a threshold or '0' otherwise. Terminal 120x may receive the PC bit from the serving sector and may adjust the transmit power of the R-PICH, as follows:

$$P_{PICH} = \begin{cases} P_{PICH} + P_{STEP} & \text{if } PC \text{ bit} = \text{'1'}, \\ P_{PICH} - P_{STEP} & \text{if } PC \text{ bit} = \text{'0'}, \end{cases} \quad \text{Eq (3)}$$

where $P_{STEP}$ is a power control step size in units of decibels (dB), and $P_{PICH}$ is the transmit power of the R-PICH for each modulation symbol.

The closed-loop power control adjusts the transmit power of the R-PICH to achieve the desired received signal quality for the R-PICH. The closed-loop power control may also be performed for another reference channel to achieve a target level of performance (e.g., a target error rate) for that reference channel.

In one design, delta-based power control may be performed for the R-ODCH. For the delta-based power control, the transmit power of the R-ODCH may be set based on the transmit power of the R-PICH and a delta, which is an offset relative to the R-PICH. In one design, terminal 120x may maintain a single delta and may adjust this delta based on the regular and fast OSI indications received from neighbor sectors. In another design, terminal 120x may maintain multiple deltas, which may include (i) a slow delta that may be adjusted based on the regular OSI indication and (ii) one or more fast deltas that may be adjusted based on the fast OSI indications. The transmit power may be determined based on the fast and/or slow deltas.

In one design, the transmit power of the R-ODCH may be determined as follows:

$$P_{ODCH,s} = P_{PICH} + Delta_{tx,i,s} + \text{Boost}, \quad \text{Eq (4)}$$

where $Delta_{tx,i,s}$ is a fast delta for subzone s in HARQ interlace i,

Boost is a boost in transmit power for a current HARQ transmission, and $P_{ODCH}$ is the transmit power of the R-ODCH for each modulation symbol.

In the design shown in equation (4), a fast delta may be maintained for each subzone s in each HARQ interlace i of interest. Each packet may be sent on the R-ODCH in a particular subzone of a particular HARQ interlace. The delta applicable for each packet may then be used to determine the transmit power for that packet. The Boost may be a zero or non-zero value and may be the same for all HARQ transmissions or different for different HARQ transmissions. The transmit power of the R-ODCH may also be determined based on other factors such as quality of service (QoS), etc.

In one design, each fast delta may be updated based on the fast OSI indications for the subzone in the PHY frames for the HARQ interlace for that fast delta, as follows:

$$Delta_{tx,i,s} = \begin{cases} Delta_{tx,i,s} + FastOSIStepUp & \text{if all } FastOSI_{j,s} = \text{'0'}, \\ Delta_{tx,i,s} - FastOSIStepDown & \text{if any } FastOSI_{j,s} = \text{'1'}, \end{cases} \quad \text{Eq (5)}$$

where FastOSIStepUp is an up step for the fast delta,

FastOSIStepDown is a down step for the fast delta, and $FastOSI_{j,s}$ is the fast OSI indication from neighbor sector j for subzone s.

Terminal 120x may maintain a set of neighbor sectors for each subzone of interest as described below. This set may be referred to as a monitor set. Terminal 120x may determine the fast delta for each subzone based on only the fast OSI indications from the neighbor sectors in the monitor set for that subzone. In one design, terminal 120x may adjust the fast delta only if it has used the fast delta for data transmission in a previous HARQ interlace and in response to the corresponding fast OSI indication. In another design, terminal 120x may adjust the fast delta at all times, even during periods of no transmission and for unassigned HARQ interlaces. A decision to adjust the fast delta may also be based on buffer size, etc.

The fast delta may be constrained to be within a range of values, as follows:

$$Delta_{tx,i,s} = \begin{cases} Delta_{max,i,s} & \text{if } Delta_{tx,i,s} > Delta_{max,i,s}, \\ Delta_{min,i,s} & \text{if } Delta_{tx,i,s} < Delta_{min,i,s}, \\ Delta_{tx,i,s} & \text{otherwise} \end{cases} \quad \text{Eq (6)}$$

where $Delta_{max,i,s}$ is a maximum value for $Delta_{tx,i,s}$, and $Delta_{min,i,s}$ is a minimum value for $Delta_{tx,i,s}$.

The minimum and maximum values for the fast delta may be selected to achieve good performance and may be fixed or configurable values. For example, the minimum and maximum fast delta values may be set based on the dynamic range of the received signal, the amount of intra-sector interference at the serving sector, etc.

Terminal 120x may identify neighbor sectors to include in the monitor set for each subzone based on various metrics. In one design, terminal 120x uses a channel difference metric, which is the difference between the channel gain of a neighbor sector and the channel gain of the serving sector. The channel gain of each sector may be estimated based on the TDM pilots, other pilots, pilot quality indicator (PQI), and/or other transmissions sent on the forward link by that sector. The channel difference for a neighbor sector may be computed as follows:

$$ChanDiff_j = \frac{RxPower_{RLSS}}{EffectiveTxPower_{RLSS}} \cdot \frac{EffectiveTxPower_j}{RxPower_j}, \quad \text{Eq (7)}$$

where $RxPower_{RLSS}$ is the received power for the serving sector on the reverse link, $EffectiveTransmitPower_{RLSS}$ is the transmit power for the serving sector, $RxPower_j$ is the received power for neighbor sector j, $EffectiveTransmitPower_j$ is the transmit power for neighbor sector j, and $ChanDiff_j$ is the channel difference for neighbor sector j.

The channel gain for a sector is equal to the received power divided by the transmitted power. The channel difference for neighbor sector j is equal to a ratio of the channel gain for the serving sector to the channel gain for neighbor sector j. Terminal 120x may add neighbor sector j to the monitor set if $ChanDiff_j$ is less than or equal to an add threshold. This criterion may ensure that the received signal strength for neighbor sector j is sufficiently strong and that the fast OSI indications from sector j can be reliably received. Terminal 120x may likely cause significant interference to only the neighbor sectors in the monitor set and may thus adjust the fast delta based on only the fast OSI indications from these sectors.

Terminal 120x may update a slow delta based on various factors such as the regular OSI indications received from neighbor sectors in a monitor set, the channel differences for the neighbor sectors, the current transmit power or PSD, etc. Terminal 120x may determine a decision variable for each neighbor sector based on pertinent factors for that sector. The decision variable may indicate whether or not to adjust the slow delta and/or how much to adjust the slow delta. Terminal 120x may compute a weighted decision for all neighbor sectors in the monitor set based on the decision variables and the channel differences for these sectors. Terminal 120x may then adjust the slow delta based on the weighted decision. The slow delta may be sent back to the serving sector and may be used along with other information by the serving sector to determine C/I values for new assignments for terminal 120x.

In general, terminal 120x may adjust the slow and fast deltas based on the same or different sets of parameters and with the same or different algorithms. Parameters that may be different for slow and fast delta adjustments may include up and down step sizes, decision thresholds, etc.

The initial values of the fast and slow deltas may be determined in various manners. In one design, an initial delta value may be computed such that:

$$\frac{averageIoT + pCoT * \text{Delta}}{averageIoT} < maxIoTRise, \quad \text{Eq (8)}$$

where averageIoT is an average interference-over-thermal (IoT) at a neighbor sector,
pCoT is a received carrier-power-over-thermal (CoT) for the reference channel as measured at the neighbor sector, and
maxIoTRise is a maximum allowable rise in IoT at the neighbor sector.

If the initial delta value from equation (8) is smaller than a minimum delta value, $\text{Delta}_{min}$, then the maximum supportable bandwidth, $W_{max}$, may be reduced such that:

$$\frac{averageIoT + (W_{max} / W_{total}) * pCoT * \text{Delta}_{min}}{averageIoT} < maxIoTRise, \quad \text{Eq (9)}$$

where $W_{total}$ is the total system bandwidth. The maximum supportable bandwidth may be sent to the serving sector and used to assign bandwidth to terminal 120x.

If terminal 120x is assigned a particular bandwidth, W, then the initial delta value may be computed such that:

$$\frac{averageIoT + (W / W_{total}) * pCoT * \text{Delta}}{averageIoT} < maxIoTRise. \quad \text{Eq (10)}$$

The amount of interference at the beginning of each transmission burst may be controlled by limiting the initial maximum supportable bandwidth $W_{max}$ based on the current delta value. This $W_{max}$ may be computed using equation (10), with W representing $W_{max}$. Terminal 120x may send $W_{max}$ to the serving sector, which may gradually increase the bandwidth over subsequent assignments to allow enough time for the fast OSI indications to adjust the delta value.

The initial delta value may also be determined in other manners and may be referred to as open loop adjustments. In one design, terminal 120x may make open loop adjustments only at the beginning of each transmission burst. In another design, if terminal 120x is not scheduled on some HARQ interlaces, then terminal 120x may use the initial delta value as a maximum value for the fast delta in order to prevent the fast delta from becoming too large due to little OSI indication activity.

Figure 3:
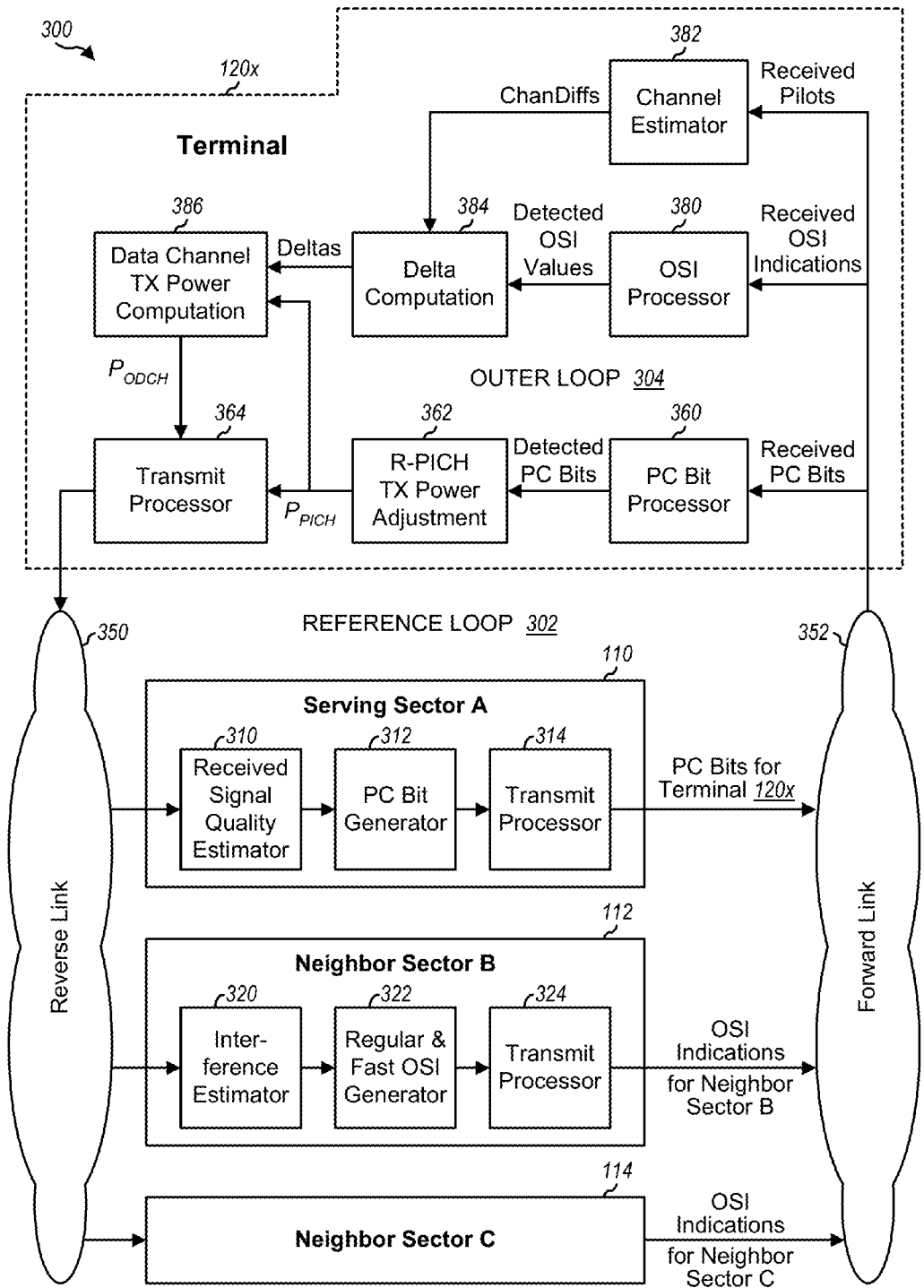
FIG. 3 shows a power control mechanism.

FIG. 3 shows a design of a power control mechanism 300 that may be used for the reverse link. Terminal 120x may communicate with serving sector 110 and may cause interference to neighbor sectors. Power control mechanism 300 includes a reference loop 302 and an outer loop 304. Reference loop 302 operates between terminal 120x and serving sector 110 and adjusts the transmit power of the R-PICH. Outer loop 304 operates between terminal 120x and the neighbor sectors and adjusts the slow and fast delta based on the regular and fast OSI indications received from the neighbor sectors. Reference loop 302 and outer loop 304 may operate concurrently but may be updated at different rates, e.g., reference loop 302 may be updated more frequently than outer loop 304.

For reference loop 302, a unit 310 at serving sector 110 may estimate the received signal quality of the R-PICH from terminal 120x. A unit 312 may compare the received signal quality against a target value and may generate PC bits based on the comparison results. A transmit processor 314 may process and transmit the PC bits as well as pilot, traffic data, and signaling on the forward link (cloud 352). Terminal 120x may receive the PC bits from sector 110. A PC bit processor 360 may detect each received PC bit and provide a corresponding detected PC bit. A unit 362 may adjust the transmit power of the R-PICH based on the detected PC bits from processor 360, e.g., as shown in equation (3).

For outer loop 304, neighbor sectors 112 and 114 may receive transmissions on the reverse link. At each neighbor sector, a unit 320 may estimate the inter-sector interference observed by that sector from terminals in other sectors. A unit 322 may generate regular and fast OSI indications based on the estimated interference, e.g., as shown in equations (1) and (2). A transmit processor 324 may process and transmit the regular and fast OSI indications on the forward link to the terminals in the other sectors. Processor 324 may also process and transmit pilot, traffic data, and signaling. Each neighbor sector may also forward the OSI indications to nearby sectors for transmission to the terminals in the nearby sectors. At terminal 120x, an OSI processor 380 may receive the regular and fast OSI indications from the neighbor sectors and provide detected OSI values. A channel estimator 382 may determine the channel difference for each neighbor sector based on pilot and/or other transmissions. A unit 384 may adjust the slow and fast deltas based on the detected OSI values, the channel differences, and other parameters. A unit 386 may determine the transmit power of the R-ODCH based on the transmit power of the R-PICH, the deltas, and/or other parameters, e.g., as shown in equation (4). A transmit processor 364 may use the transmit power of the R-ODCH for data transmission to serving sector 110.

For clarity, delta-based power control using the fast delta adjusted based on the fast OSI indications has been described above. The transmit power of terminal 120x may also be adjusted with the regular and fast OSI indications based on other power control algorithms.

FIG. 4 shows a design of a process 400 for transmitting OSI indications. Process 400 may be performed by a sector/base station. Multiple OSI indications for multiple subzones may be determined, e.g., in each frame, with each subzone corresponding to a different portion of the system bandwidth (block 412). These OSI indications may correspond to the fast OSI indications described above. For block 412, the interference observed by the sector due to terminals in neighbor sectors may be estimated. The estimated interference may be averaged over each subzone to obtain an average interference for that subzone. The OSI indication for each subzone may be determined based on the average interference for that subzone. Each OSI indication may comprise a single bit that may be set (i) to a first value (e.g., '1') if high interference is observed in a corresponding subzone or (ii) to a second value (e.g., '0') if high interference is not observed in the corresponding subzone.

The multiple OSI indications may be processed for transmission, e.g., broadcast to terminals in neighbor sectors (block 414). For block 414, at least one report may be generated for the multiple OSI indications, with each report including at least one OSI indication for at least one subzone (block 416). For example, each report may include four OSI indications for four subzones. Each report may include four bits for the four OSI indications and may be encoded to obtain code bits, which may be mapped to a sequence of six modulation symbols (block 418). A sequence of six modulation symbols of zero values may be generated for each report with all four OSI indications set to zero to indicate lack of high interference in the four corresponding subzones.

A regular OSI indication for the system bandwidth may be determined, e.g., in each superframe based on a long-term average interference over the system bandwidth and across the superframe (block 420). The regular OSI indication may be determined based on at least one first threshold for comparing the long-term average interference. The multiple OSI indications may be determined based on at least one second threshold that is higher than the at least one first threshold. This may result in the multiple OSI indications being less likely to be set than the regular OSI indication. The multiple OSI indication may be transmitted at a first rate (e.g., each frame) and over a first coverage area (block 422). The regular OSI indication may be transmitted at a second rate (e.g., each superframe) that may be slower than the first rate and over a second coverage area, which may be wider than the first coverage area (block 424).

FIG. 5 shows a design of an apparatus 500 for transmitting OSI indications. Apparatus 500 includes means for determining multiple OSI indications for multiple subzones (module 512), means for processing the multiple OSI indications for transmission (module 514), means for generating at least one report for the multiple OSI indications (module 516), means for encoding and symbol mapping each report to a sequence of modulation symbols (module 518), means for determining a regular OSI indication for the system bandwidth (module 520), means for transmitting the multiple OSI indication (module 522), and means for transmitting the regular OSI indication (module 524).

Figures 6, 7:
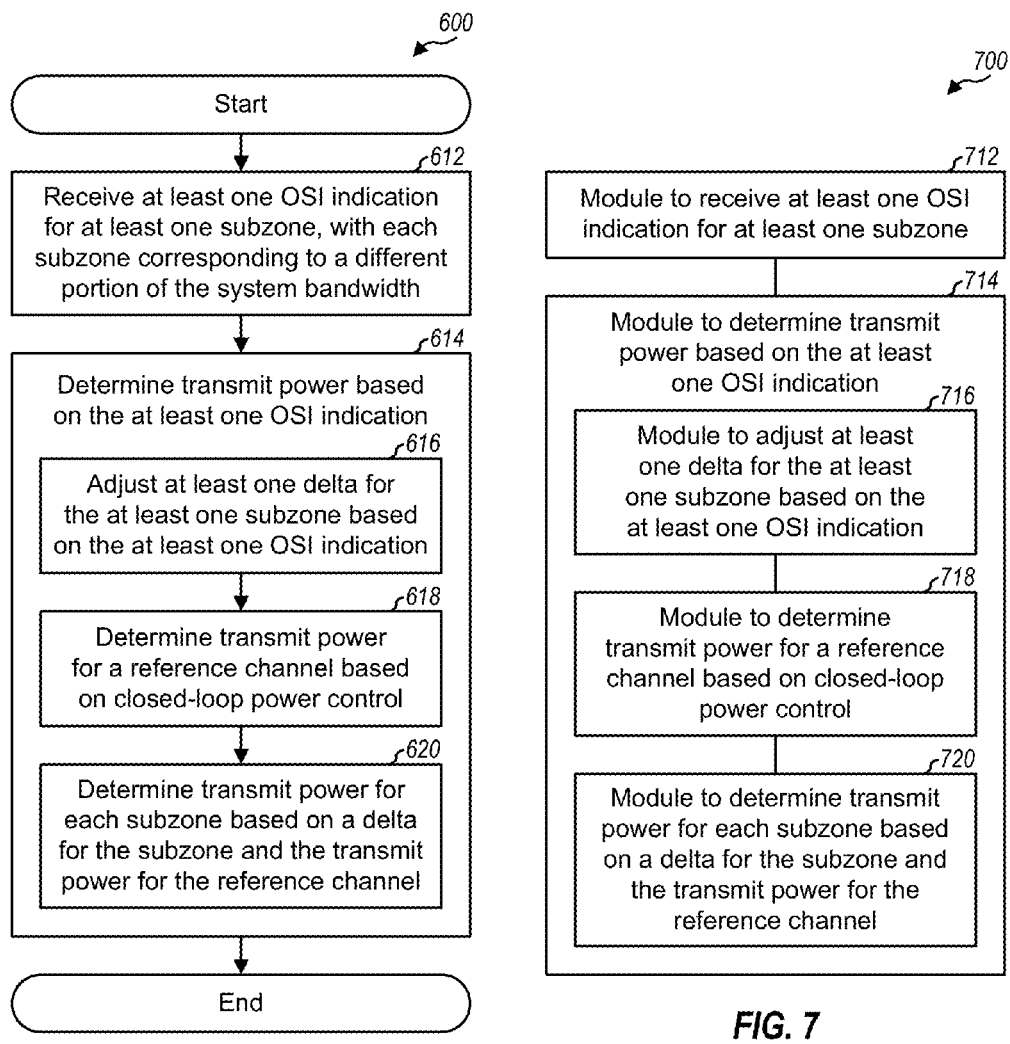
FIG. 6 shows a process for receiving OSI indications.
FIG. 7 shows an apparatus for receiving OSI indications.

FIG. 6 shows a design of a process 600 for receiving OSI indications. Process 600 may be performed by a terminal. At least one OSI indication for at least one subzone may be received, with each subzone corresponding to a different portion of the system bandwidth (block 612). The at least one OSI indication may be received from at least one neighbor sector in a monitor set. The monitor set may be updated based on channel gains for neighbor sectors and channel gain for a serving sector.

Transmit power (e.g., for a data channel) may be determined based on the at least one OSI indication (block 614). For block 614, at least one delta for the at least one subzone may be adjusted based on the at least one OSI indication (block 616). The delta for each subzone may be (i) increased if all OSI indications for the subzone indicate lack of high interference or (ii) decreased if any OSI indication for the subzone indicates high interference. The transmit power for a reference channel may be determined based on closed-loop power control (block 618). The transmit power for each subzone may then be determined based on a delta for that subzone and the transmit power for the reference channel (block 620).

The at least one OSI indication for the at least one subzone may be received for at least one interlace (e.g., HARQ interlace), with each interlace including frames spaced apart by a predetermined number of frames. A delta for each subzone in each interlace may be adjusted based on OSI indications received for the subzone in the interlace and may be used to determine the transmit power for the subzone in the interlace.

A regular OSI indication for the system bandwidth may also be received in each superframe. The transmit power may be determined based further on the regular OSI indication.

FIG. 7 shows a design of an apparatus 700 for receiving OSI indications. Apparatus 700 includes means for receiving at least one OSI indication for at least one subzone (module 712), means for determining transmit power based on the at least one OSI indication (module 714), means for adjusting at least one delta for the at least one subzone based on the at least one OSI indication (module 716), means for determining the transmit power for a reference channel based on closed-loop power control (module 718), and means for determining the transmit power for each subzone based on a delta for that subzone and the transmit power for the reference channel (module 720).

The modules in FIGS. 5 and 7 may comprise processors, electronics devices, hardware devices, electronics components, logical circuits, memories, etc., or any combination thereof.

Figure 8:
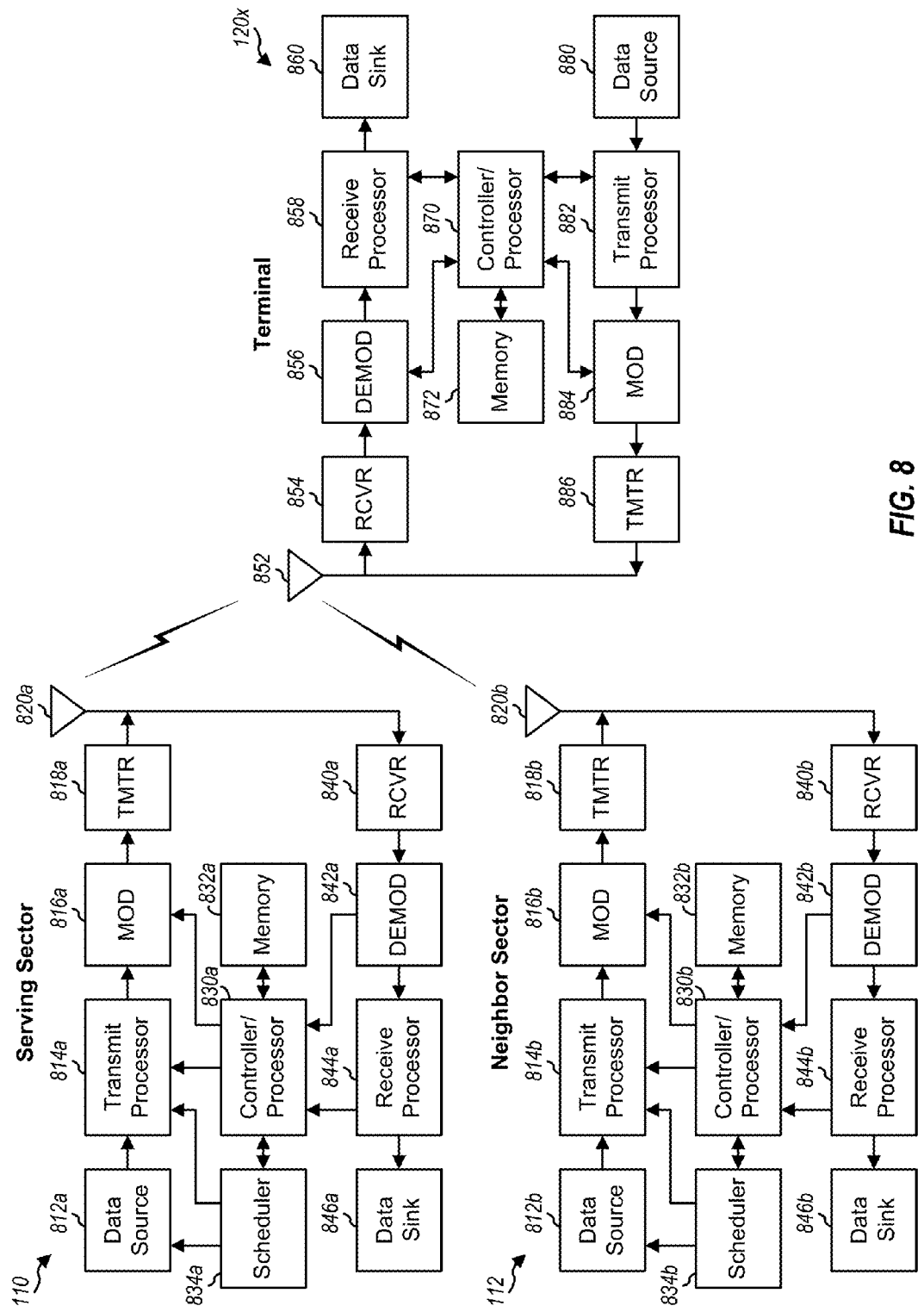
FIG. 8 shows a block diagram of a terminal and two sectors/base stations.

FIG. 8 shows a block diagram of a design of terminal 120x, serving sector/base station 110, and neighbor sector/base station 112 in FIG. 1. At sector 110, a transmit processor 814a may receive traffic data from a data source 812a, signaling (e.g., PC bits) from a controller/processor 830a, and/or assignments of time frequency resources from scheduler 834a. Transmit processor 814a may process (e.g., encode, interleave, and symbol map) the traffic data, signaling, and pilot and provide modulation symbols. A modulator (MOD) 816a may perform modulation on the modulation symbols (e.g., for OFDM) and provide output chips. A transmitter (TMTR) 818a may conditions (e.g., convert to analog, amplify, filter, and upconvert) the output chips and generate a forward link signal, which may be transmitted via an antenna 820a.

Sector 112 may similarly process traffic data and signaling for terminals served by sector 112. The traffic data, signaling, and pilot may be processed by a transmit processor 814b, modulated by a modulator 816b, conditioned by a transmitter 818b, and transmitted via an antenna 820b.

At terminal 120x, an antenna 852 may receive the forward link signals from sectors 110 and 112 and possibly other sectors. A receiver (RCVR) 854 may condition (e.g., filter, amplify, downconvert, and digitize) a received signal from antenna 852 and provide samples. A demodulator (DEMOD) 856 may perform demodulation on the samples (e.g., for OFDM) and provide symbol estimates. A receive processor 858 may process (e.g., symbol demap, deinterleave, and decode) the symbol estimates, provide decoded data to a data sink 860, and provide decoded signaling (e.g., PC bits, OSI indications, etc.) to a controller/processor 870.

On the reverse link, a transmit processor 882 may receive and process traffic data from a data source 880 and signaling from controller/processor 870 and provide symbols. A modulator 884 may perform modulation on the symbols (e.g., for OFDM, CDM, etc.) and provide output chips. A transmitter 886 may condition the output chips and generate a reverse link signal, which may be transmitted via antenna 852.

At each sector, the reverse link signals from terminal 120x and other terminals may be received by antenna 820, conditioned by a receiver 840, demodulated by a demodulator 842, and processed by a receive processor 844. Processor 844 may provide decoded data to a data sink 846 and decoded signaling to controller/processor 830. At serving sector 110, demodulator 842a may estimate the received signal quality for terminal 120x. Controller/processor 830a may generate PC bits for terminal 120x based on the received signal quality. At neighbor sector 112, demodulator 842b may estimate the interference observed by the sector. Controller/processor 830b may generate the regular and fast OSI indications based on the estimated interference.

Controllers/processors 830a, 830b and 870 may direct the operation at sectors 110 and 112 and terminal 120x, respectively. Memories 832a, 832b and 872 may store data and program codes for sectors 110 and 112 and terminal 120x, respectively. Schedulers 834a and 834b may schedule terminals communicating with sectors 110 and 112, respectively, and may assign channels and/or time frequency resources to the terminals.

The processors in FIG. 8 may perform various functions for the techniques described herein. For example, processor 830a may implement units 310 and/or 312 in FIG. 3 for serving sector 110. Processor 830b may implement units 320 and/or 322 in FIG. 3 for neighbor sector 112 and may perform process 400 in FIG. 4 and/or other processes for the techniques described herein. Processor 858, 870 and/or 882 may implement some or all of units 360 through 386 in FIG. 3 for terminal 120x and may perform process 600 in FIG. 6 and/or other processes for the techniques described herein.

The concept of channels described herein may refer to information or transmission types that may be transmitted by a terminal or a base station. It does not require or utilize fixed or predetermined sets of subcarriers, time periods, or other resources dedicated to such transmissions. Furthermore, time frequency resources are exemplary resources that may be assigned and/or used for sending data and messages/signaling. The time frequency resources may also comprise frequency subcarriers, transmission symbols, and/or other resources in addition to time frequency resources.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 832a, 832b or 872 in FIG. 8) and executed by a processor (e.g., processor 830a, 830b or 870). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to:
determine multiple fast other sector interference (OSI) indications for multiple subzones, each subzone corresponding to a different portion of system bandwidth, wherein each fast OSI indication is determined based on a short term average of interference over a different portion of the system bandwidth,
determine a regular OSI indication for the system bandwidth based on a long term average of interference over the system bandwidth, and
process the multiple fast OSI indications for transmission; and
a memory coupled to the at least one processor.

2. The apparatus of claim 1, wherein the at least one processor is configured to determine the multiple fast OSI indications for the multiple subzones in each frame of a predetermined duration.

3. The apparatus of claim 1, wherein the at least one processor is configured to estimate interference observed by a sector due to terminals in neighbor sectors, and to determine the multiple fast OSI indications for the multiple subzones based on the estimated interference.

4. The apparatus of claim 3, wherein the at least one processor is configured to average the estimated interference over each subzone to obtain an average interference for the subzone, and to determine an OSI indication for each subzone based on the average interference for the subzone.

5. The apparatus of claim 3, wherein the at least one processor is configured to average the estimated interference over the system bandwidth to obtain a long-term average interference, and to determine the regular OSI indication based on the long-term average interference.

6. The apparatus of claim 1, wherein each OSI indication comprises a single bit, and wherein the at least one processor is configured to set the single bit for each OSI indication to a first value if high interference is observed in a corresponding subzone, and to set the single bit for each OSI indication to a second value if high interference is not observed in the corresponding subzone.

7. The apparatus of claim 1, wherein the at least one processor is configured to generate at least one report for the multiple fast OSI indications, each report comprising at least one OSI indication for at least one subzone.

8. The apparatus of claim 7, wherein each report comprises four OSI indications for four subzones.

9. The apparatus of claim 8, wherein each report comprises four bits for the four OSI indications, and wherein the at least one processor is configured to encode each report of four bits to obtain code bits, and to generate a sequence of six modulation symbols for each report based on the code bits for the report.

10. The apparatus of claim 7, wherein the at least one processor is configured to generate a sequence of modulation symbols of zero values for each report with all of the at least one OSI indication set to a predetermined value.

11. The apparatus of claim 8, wherein the at least one processor is configured to generate a sequence of six modulation symbols of zero values for each report with all four OSI indications set to zero to indicate lack of high interference in the four corresponding subzones.

12. The apparatus of claim 1, wherein the at least one processor is configured to broadcast the multiple fast OSI indications to terminals in neighbor sectors.

13. The apparatus of claim 1, wherein the at least one processor is configured to transmit the multiple fast OSI indications for the multiple subzones at a first rate, and to transmit the regular OSI indication for the system bandwidth at a second rate slower than the first rate.

14. The apparatus of claim 1, wherein the at least one processor is configured to transmit the multiple fast OSI indications for the multiple subzones over a first coverage area, and to transmit the regular OSI indication for the system bandwidth over a second coverage area wider than the first coverage area.

15. The apparatus of claim 1, wherein the at least one processor is configured to determine the regular OSI indication based on at least one first threshold for comparing estimated interference, and to determine the multiple fast OSI indications based on at least one second threshold higher than the at least one first threshold.

16. A method for wireless communication, comprising:
    determining, by a processor of a base station in a wireless communication system, multiple fast other sector interference (OSI) indications for multiple subzones, each subzone corresponding to a different portion of system bandwidth, wherein each fast OSI indication is determined based on a short term average of interference over a different portion of the system bandwidth;
    determining, by the processor, a regular OSI indication for the system bandwidth based on a long term average of interference over the system bandwidth; and
    processing, by the processor, the multiple fast OSI indications for transmission.

17. The method of claim 16, wherein the determining the multiple fast OSI indications comprises determining, by the processor, the multiple fast OSI indications for the multiple subzones in each frame of a predetermined duration.

18. The method of claim 16, wherein the processing the multiple fast OSI indications comprises generating, by the processor, at least one report for the multiple fast OSI indications, each report comprising at least one OSI indication for at least one subzone.

19. The method of claim 18, wherein each report comprises four OSI indications for four subzones, and wherein the processing the multiple fast OSI indications further comprises:
    encoding, by the processor, each report to obtain code bits, and
    generating, by the processor, a sequence of six modulation symbols for each report based on the code bits for the report.

20. The method of claim 19, wherein the processing the multiple fast OSI indications further comprises generating, by the processor, a sequence of six modulation symbols of zero values for each report with all four OSI indications set to zero to indicate lack of high interference in the four corresponding subzones.

21. A non-transitory computer-readable medium comprising:
    code for causing at least one computer to determine multiple fast other sector interference (OSI) indications for multiple subzones, each subzone corresponding to a different portion of system bandwidth, wherein each fast OSI indication is determined based on a short term average of interference over a different portion of the system bandwidth;
    code for causing the at least one computer to determine a regular OSI indication for the system bandwidth based on a long term average of interference over the system bandwidth; and
    code for causing the at least one computer to process the multiple fast OSI indications for transmission.

* * * * *